(12) United States Patent
Ono

(10) Patent No.: US 8,025,819 B2
(45) Date of Patent: Sep. 27, 2011

(54) MANUFACTURING METHOD OF PLASTIC LENS AND THE LENS

(75) Inventor: Kotaro Ono, Fukui (JP)

(73) Assignee: Washi Kosan Co., Ltd., Tokyo (JP)

( * ) Notice: Subject to any disclaimer, the term of this patent is extended or adjusted under 35 U.S.C. 154(b) by 762 days.

(21) Appl. No.: 10/547,222

(22) PCT Filed: Jun. 24, 2004

(86) PCT No.: PCT/JP2004/009301
§ 371 (c)(1),
(2), (4) Date: Oct. 14, 2005

(87) PCT Pub. No.: WO2005/030465
PCT Pub. Date: Apr. 7, 2005

(65) Prior Publication Data
US 2008/0067703 A1    Mar. 20, 2008

(30) Foreign Application Priority Data

Sep. 25, 2003  (JP) ................................ 2003-334437
Dec. 24, 2003  (JP) ................................ 2003-427274

(51) Int. Cl.
*B29D 11/00* (2006.01)
(52) U.S. Cl. ..................................................... 264/1.32
(58) Field of Classification Search .................. 264/153, 264/1.1, 1.36, 2.2, 2.3, 2.5, 297.2, 297.3, 264/297.6, 297.8, 1.32; 425/347, 348 R, 425/411, 447, 449, 808
See application file for complete search history.

(56) References Cited

U.S. PATENT DOCUMENTS

| | | | | |
|---|---|---|---|---|
| 4,435,143 A | * | 3/1984 | Dempsey | 425/150 |
| 6,015,512 A | | 1/2000 | Yang et al. | |
| 6,042,754 A | * | 3/2000 | Yang et al. | 264/1.1 |
| 6,162,376 A | * | 12/2000 | Mead | 264/2.4 |
| 6,511,617 B1 | * | 1/2003 | Martin et al. | 264/1.36 |
| 2008/0067703 A1 | * | 3/2008 | Ono | 264/2.2 |

FOREIGN PATENT DOCUMENTS

| | | |
|---|---|---|
| JP | 57-4735 | 1/1982 |
| JP | 64-69313 | 3/1989 |
| JP | 2002-537155 | 11/2002 |

* cited by examiner

*Primary Examiner* — Christina Johnson
*Assistant Examiner* — Larry Thrower
(74) *Attorney, Agent, or Firm* — Jordan and Hamburg LLP

(57) ABSTRACT

The present invention provides a plastic lens which can simplify the installation, can enhance the forming accuracy and can exhibit extremely small optical irregularities. Molds having a planned combination are heated, using at least one pre-numerically controlled automatic chucking transport device and/or manually, the molds are constituted to be sequentially overlapped in accordance with the combination. First of all, an optical thermoplastic resin molten material having an extremely small agitation flow is placed on a forming surface of one lower mold. Subsequently, a forming surface of another upper mold is brought into contact with the resin molten material by inclining the posture of the upper mold, and both molds are made to approach each other to define a given distance therebetween so as to form a lens by pressing the resin molten material.

13 Claims, 6 Drawing Sheets

MANUFACTURING METHOD OF PLASTIC LENS AND THE LENS

FIELD OF THE INVENTION

The present invention relates to a manufacturing method of a plastic lens which uses optical thermoplastic resin and the lens.

DESCRIPTION OF THE RELATED ART

As manufacturing methods of a plastic lens, injection molding and cast molding have been generally known, wherein the former uses thermoplastic resin and the latter uses thermosetting resin. The injection molding method uses a mold and discharges resin which is melted at a temperature slightly lower than a resin decomposition temperature from a nozzle formed in a portion of the mold by applying pressure to the resin. Accordingly, turbulence is liable to be easily generated in the flow of resin in the inside of the mold and hence, there observed is a tendency that striae and polarization irregularities are generated in a produced lens and, at the same time, there also observed is a tendency that the lens lacks uniformity when the lens is dyed. Although resin having a relatively small molecular weight is used to improve the resin flow, there exist irregularities with respect to the mechanical strength and hence, an utmost care is required for forming holes. However, the injection molding method can easily adopt the full automation and hence, the injection molding method can exhibit superiority with respect to a manufacturing cost. Recently, there has been proposed a method which enables the continuous production of the plastic lens while eliminating these drawbacks and the method has been attracting an attention. The technique is disclosed in patent literature 1 (Japanese National Publication of Translated Version of PCT Application 2002-501844) and patent literature 2 (U.S. Pat. No. 6,015,512), wherein resin is discharged from an extruding machine in a relatively high viscous state to form a columnar resin molten material and the resin molten material is clamped by two glass molds to form a lens. Due to such a technique, although a required quantity of glass mold is increased, it is possible to manufacture a plastic lens which has extremely small amount of striae and polarization irregularities. However, since the lens is integrally manufactured at a high speed, facilities are liable to become excessive to take a time-sequential balance among respective steps and, at the same time, there exist portions to be improved in respective steps. The present invention has been proposed in view of these points. Although in the above-mentioned patent literature 1 and patent literature 2, there is no description and there is no particular argument with respect to shapes of a lower mold and an upper mold of a mold in a molding step, in appearance, a molding surface of the mold which is arranged at a lower side may be either a concave shape or a convex shape. However, to consult with the drawing, the molding surface of the mold which is arranged at the lower side has the concave shape and the molding surface of the mold arranged at the upper side has the convex shape. It is estimated that this provision is proposed by taking the posture of the mold which is liable to be brought into point contact when the upper mold is placed on the resin molten material into consideration. Further, the resin molten material has the columnar shape and has a fixed thickness and hence, when the resin molten material is pressed and elongated using the mold, the spreading of resin is not always generated such that the resin spreads uniformly outwardly from the center.

Accordingly, it is an object of the present invention to realize a plastic lens which has an extremely small amount of optical irregularities while simplifying facilities and enhancing the working accuracy.

DESCRIPTION OF THE INVENTION

According to the first aspect of the present invention, in an extrusion pressure molding which molds a resin lens in a cylinder by moving a plurality of cylinders having an inner diameter substantially equal to a diameter of a pair of molds for forming the lens, the improvement is characterized in that the molds having a planned combination are heated, using at least one pre-controlled mold transport device and/or manually, the molds are constituted to be sequentially overlapped in accordance with the combination, first of all, an optical thermoplastic resin molten material (hereinafter described as resin molten material) having no agitation flow or having an extremely small agitation flow flowed out from a nozzle of an extruding machine is placed on one mold, and subsequently, another mold is placed on the resin molten material, and both molds are made to approach each other to define a given distance therebetween so as to form a plastic lens by pushing the resin molten material. A uniaxial extruding machine, a biaxial extruding machine or an extruding machine which is a combination of these extruding machines is used as the extruding machine, and the extruding machine is configured to discharge an amount of resin to be melted without generating the dwelling of the resin and, after discharging, to allow the resin to be continuously discharged in a state that no outer force other than gravity is applied to the resin thus forming the resin molten material, and the resin molten material is placed on the mold without giving rise to an agitation flow in the inside of the resin molten material. Accordingly, a shape of the resin molten material assumes a cross-sectional shape which conforms to a shape of the nozzle of the extruding machine. Further, at the time of heating the combined two molds in a heating furnace, these molds are suitably arranged close to each other in the fore-and-aft direction or in the left-and-right direction so as to facilitate at least one mold transport device or an operator to easily perform the combination of the molds. After heating, in accordance with the combination, first of all, the lower mold to be overlapped is arranged at an opening portion of the cylinder using a chucking device of the mold transport device. Subsequently, the resin molten material is placed in the diameter direction of the mold and, thereafter, the upper mold is arranged using the same mold transport device. Although a so-called robot hand is used as the mold transport device, as another method, it may be possible to use a transport device which feeds the mold in synchronism with the moving speed in the moving direction of the moving cylinder. Such a step for automatically transporting the mold as this can be performed manually when an operator cost is cheap.

According to the second aspect of the present invention, out of two molds which have the planned combination, the mold having a convex forming surface is placed and heated on a transport platform with the forming surface directed upwardly and the mold having a concave forming surface is placed and heated on the transport platform with the forming surface directed downwardly. Using at least one pre-controlled mold transport device and/or manually, first of all, one mold having the convex forming surface is placed on an opening portion of the cylinder with the forming surface directed upwardly. The resin molten material flowed out from the nozzle of the extruding machine is placed on the convex forming surface. Subsequently, another mold having the concave forming surface is placed on the resin molten material with the forming surface directed downwardly. Both molds are made to approach each other to define a given distance therebetween so as to form a plastic lens by pushing the resin molten material. Although a material of the mold is not specifically limited, the mold may preferably be made of glass in view of the heat-resistant temperature and the easiness of machining of the precise forming surface. Two combined molds are placed on the transport platform such as a conveyor or the like. Since a lens for glasses has a meniscus shape, a forming surface of the mold which forms an eye-facing side of the lens has a convex shape and a forming surface of the mold which forms an object-facing side of the lens has a concave shape. Accordingly, with respect to the postures of the respective molds placed on the conveyor of the heating furnace, the mold which constitutes the eye-facing side forms the forming surface directing upwardly and the mold which constitutes the object-facing side forms the forming surface directing downwardly and hence, the forming surface of the mold is not brought into contact with the conveyor. Accordingly, it is unnecessary to turn over the mold at the time of transporting the mold onto the cylinder and hence, the mold transport device can be simplified. Further, the arrangement of the molds of the present invention assumes a state in which the forming surface has a downward gradient when the resin molten material is pushed and extended and hence, the resin hardly receives a load.

The third aspect of the present invention is characterized in that with respect to a portion of the resin molten material which is placed on one mold, a center portion thereof is thicker than other portion (namely has a larger volume per length than other portion). This characteristic can be obtained by changing a diameter of a nozzle of an extruding machine which melts resin pellets and extrudes the molten resin, or by changing a moving speed of the mold, or by changing the distance between the mold and the nozzle. Since the lens has a meniscus shape, with respect to forming surfaces of the molds, the forming surface of the mold which forms an object-facing-side surface has a concave surface shape and the forming surface of the mold which forms an eye-facing-side surface has a convex surface shape. Irrespective of whether the lens is a plus lens or a minus lens, since the placed resin molten material must be extended outwardly from a center portion of the mold, the placement of the resin molten material on the convex surface of the mold is preferable to allow the molten material to spread by its own weight. Further, with respect to the minus lens, a peripheral portion thereof requires a larger amount of resin for forming the lens. However, to expect the uniform spreading of the resin, the center portion of the mold requires a larger amount of resin molten material than the peripheral portion and it is preferable to spend an extra step and an extra time for this step. Since the plus lens has the thick center portion and gradually decreases the thickness toward the peripheral portion, this condition becomes more requisite.

The fourth aspect of the present invention is characterized in that an engaging member for engaging the mold is provided movably in the vertical direction close to the opening portion of the cylinder so as to incline a posture of the upper mold to be arranged and to lower the upper mold in a posture having an angle with respect to the mold which is arranged below, whereby the upper mold is arranged on the placed resin molten material in a state that air is not entangled. It is preferable to incorporate the engaging member into a guide pole which performs the positioning of the mold in the opening portion. Since four guide poles are provided, four sets of engaging members are also arranged. Since the respective molds which are arranged at the lower side and the upper side are transported from the heating furnace in an overlapped manner as mentioned above, first of all, the lower mold is moved onto the four sets of engaging members using the mold transport device, four sets of engaging members are lowered at a same speed, the mold is moved to the opening portion of the cylinder and is placed on a piston described later and, thereafter, the engaging members return to original positions. Next, the resin molten material is placed on the lower mold and, thereafter, the upper mold is again moved onto the engaging member. Two sets of engaging members are lowered and, subsequently, another two sets of engaging members are lowered so as to incline the upper mold. Thereafter, all engaging members are lowered and hence, the mold which is held in the inclined posture can be placed on the resin molten material. The mold which is lowered from above the resin molten material in the inclined posture the mold is initially brought into point or line contact with the resin molten material and the portions thereof which come into contact with the resin molten material are gradually enlarged whereby the entanglement of air can be prevented.

The fifth aspect of the present invention is characterized in that out of a step of heating the mold, a step of arranging the mold on the cylinder, a forming step of moving two molds including a resin molten material close to each other thus pushing the resin molten material, an annealing step of integrally heating the mold and formed resin molten material after pressing, and a step of taking out the lens from the mold, the plastic lens is manufactured by making at least one step independently from other steps. By manipulating these steps independently, the forming accuracy is enhanced and hence, even when any trouble occurs in each step, it is unnecessary to retract the work whereby the stability of manufacturing can be ensured. Particularly, by performing the annealing step in batch processing, it is possible to accurately control periods for a high temperature portion and a gradual cooling portion of the furnace inner temperature and hence, the lens having the small internal strain can be easily obtained. Although the above-mentioned steps may be incorporated into the manufacturing line as a series of steps, since the required periods for respective steps are naturally different from each other, when the time-oriented restriction is imparted to the forming step, the time for pressing the resin molten material is shortened thus giving rise to the generation of strains in the inside of the lens.

According to the present invention, the mass production of the plastic lens having the extremely small optical strain using the optical thermoplastic resin is facilitated. As the thermoplastic resin, for example, polycarbonate resin or the like is preferably used. Since the method of the present invention can use the resin having the large molecular weight compared to the injection molding, the plastic lens exhibits the high mechanical strength. Further, the plastic lens produced by the forming method of the present invention has no internal strain and hence, chipping or cracks are not generated during a boring operation. Since the orientation of resin in the inside of the lens is extremely small, when the lens is dyed, the die irregularities are not generated. By providing the engaging members to the guide poles thus enabling the accurate movement of the molds, the accuracy of the forming steps can be remarkably enhanced and, at the same time, by supplying a larger amount of resin molten material to the center portion than other portions, it is possible to extend the resin uniformly at the time of molding thus preventing the generation of the agitation flow of resin.

In the plastic lens which is obtained by the above-mentioned manufacturing method, the resin molten material is substantially uniformly extended toward the periphery from the center of the mold and hence, it is possible to obtain the optically uniform lens with respect to the striae, the polarization and the like. Particularly, the molten resin is uniformly extended with respect to a lens which changes a curvature of a forming surface thereof such as an increment multifocal lens, an aspherical lens or the like and hence, the accurate formed surface is obtained whereby it is possible to provide the lens with the least strain. Particularly, although polycarbonate resin is liable to generate birefringence, the lens manufactured by the present invention is an excellent plastic lens in which an agitation flow of resin is not recognized even when the lens is observed through a polarization filter.

BRIEF DESCRIPTION OF THE DRAWINGS

FIG. 3A to FIG. 3C are views showing shapes of a resin molten material and a shape of a lens, wherein FIG. 3A shows the shape of the resin molten material of the present invention, FIG. 3B is a plan view showing the shape of the conventional resin molten material, and FIG. 3C is a cross-sectional view showing the shape of lens (embodiment 2);

FIG. 4A to FIG. 4C are views showing dies and a nozzle of an extruding machine, wherein FIG. 4A is a front view of the die, FIG. 4B is a front view of the die in a state that a die opening portion is changed, and FIG. 4C is a schematic cross-sectional view of a nozzle of the extruding machine (embodiment 2);

FIG. 5A to FIG. 5C are views showing an engaging member and a mold, wherein FIG. 5A is a longitudinal cross-sectional view showing the constitution of the engaging member and FIG. 5B and FIG. 5C are side views showing the posture of the mold (embodiment 3)

DESCRIPTION OF THE PREFERRED EMBODIMENTS

Cylinders are formed on the same circumference of a rotating turntable, each cylinder includes a lower piston which receives a lower mold and an upper piston which presses an upper mold. First of all, the lower mold is arranged on the lower piston using a chucking device. The turntable is rotated and a resin molten material is placed on the lower mold. Further, the upper mold is arranged at the upper side and the upper piston is pushed downwardly and, thereafter, both pistons are lowered to fetch the resin molten material having a given length. The upper piston is further pushed downwardly so as to press the resin molten material in the inside of the cylinder to expand the resin molten material thus forming a lens. Accordingly, a plastic lens which exhibits an extremely small amount of optical strain can be realized. In this embodiment, as the resin molten material, polycarbonate resin is used.

Embodiment 1

Figure 1:
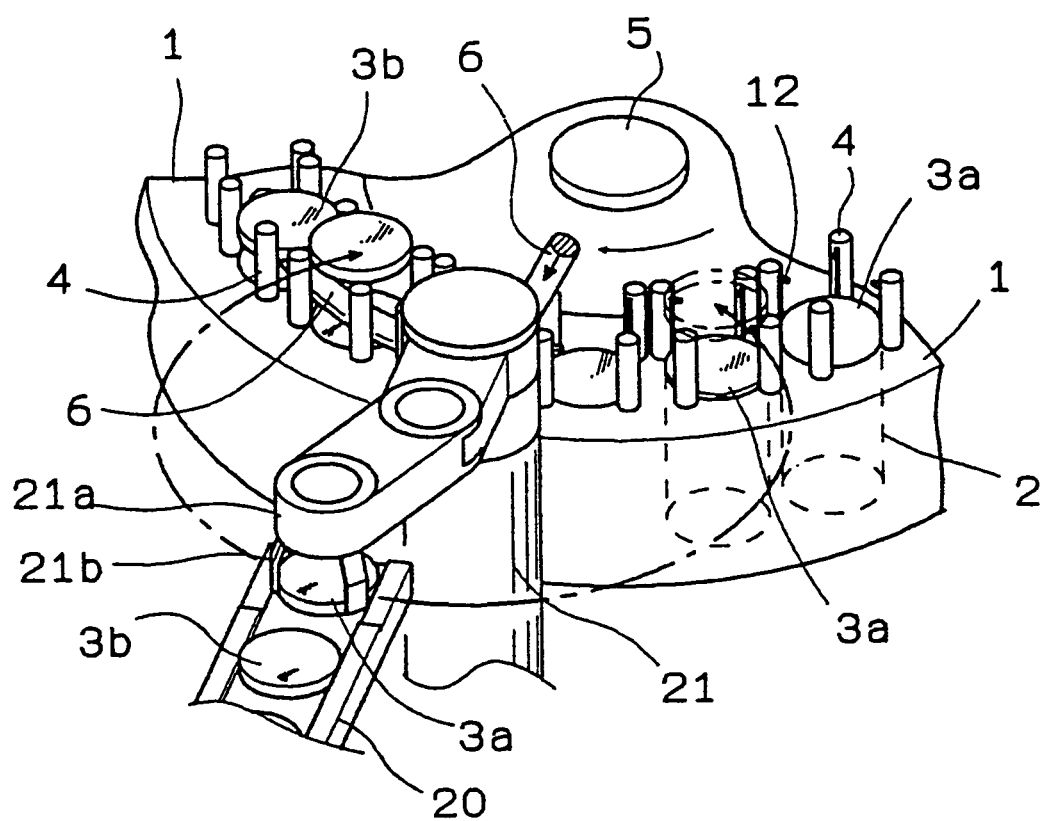
FIG. 1 is a perspective view showing a portion of a molding step of the present invention (embodiment 1)

FIG. 1 is a perspective view schematically showing a portion of a turntable 1. The turntable 1, as a whole, has a circular disc shape and respective members which are shown in a perspective view are arranged on all periphery of the turntable 1. The turntable 1 is rotated about a rotary shaft 5 at a fixed speed. With respect to respective molds which are arranged at a lower side and an upper side, a pair of molds having a planned combination are arranged in the fore-and-aft direction or in the left-and-right direction, and is placed on a transport platform 20 of a heating furnace to be heated. In this embodiment, the transport platform 20 is moved in the heating furnace, wherein the pair of molds are arranged in the fore-and-aft direction at an exit, that is, the mold 3a which is arranged at the lower side and the mold 3b which is arranged at the upper side are arranged in series in the advancing direction. Transporting of the mold is performed by one transport means. In arranging, first of all, the lower mold 3a at an upper opening portion of the cylinder 2 formed in the rotating turntable 1, a robot hand which constitutes an mold transport device 21 is arranged between the turntable 1 and an end portion of the transport platform 20 of the heating furnace. A chuck 21b is mounted on a distal end portion of an arm 21a so as to grip the mold 3a on the transport platform 20. The chuck 21b is revolved in the direction indicated by a chain line and the mold 3a is transported onto a center portion surrounded by four guide poles 4 and is placed on an engaging member 12 described later. The engaging member 12 is lowered so as to place the mold 3a on a piston in the inside of the cylinder 2 thus completing the transport of the lower mold 3a. Thereafter, a height of the piston is adjusted to make a peripheral portion of a forming surface of the mold 3a and an upper surface of the turntable 1 coplanar with each other. When a resin molten material 6 made of polycarbonate resin is discharged from an extruding machine (not shown in the drawing) using a center portion of the lower mold 3a as a target, due to the rotation of the turntable 1, the resin molten material passes through the center portion from one side of the lower mold and reaches and is placed on another side of the lower mold 3a. The manner of placing the resin molten material 6 is described later. In arranging the upper mold 3b to the placed resin molten material 6, the mold 3b on the transport platform 20 is moved and is stopped at a position of a distal end portion of the transport platform. Then, the mold 3b is clamped by the chuck 21b and is revolved in the direction indicated by a chain line opposite to the chain line of the mold 3a so as to transport the mold 3b to the center portion of the guide pole 4 and the mold 3b is placed on the engaging member 12. Thereafter, the engaging member 12 is lowered and places the mold 3b on the resin molten material 6 while inclining the posture of the mold 3b. During this period, the turntable 1 is rotated at a fixed peripheral speed. As described above, according to the present invention, the mold transport means after heating can be provided as one set and hence, the manufacturing steps can be simplified. In this embodiment, as a material of the resin molten material 6, polycarbonate resin is used. Although a glass transition point Tg of polycarbonate resin is 147° C., the polycarbonate resin exhibits a high melting point (220 to 230° C.) and hence, molding temperatures are set such that a temperature of the resin molten material is 270° C., a temperature of the mold is 240° C., and a temperature of the cylinder is 140° C. The temperature of the mold is set to fall within a range where the temperature is higher than the glass transition point and is lower than a melting point of the using resin. Although the polycarbonate resin is used as the material of the mold in this embodiment, when other thermoplastic resin is used, a temperature which corresponds to the characteristics of the resin may be set.

Figure 2:
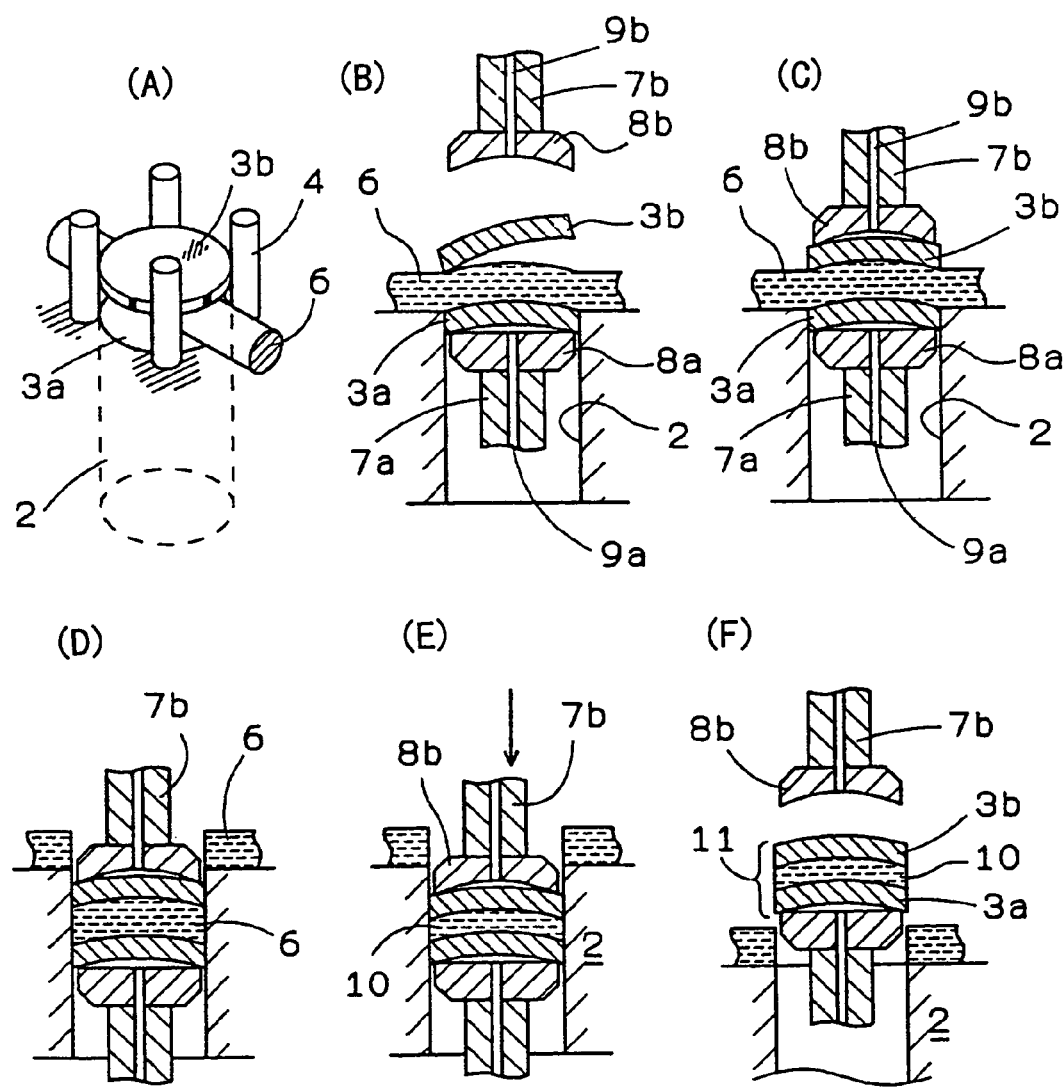
FIG. 2A to FIG. 2F are schematic views for explaining the sequence of the molding step (embodiment 1)

The states of operation of the cylinder, the piston and the resin molten material are explained in conjunction with FIG. 2A to FIG. 2F. In FIG. 2A which is a perspective view, the lower mold 3a which is arranged coplanar with an upper opening portion of the cylinder 2 indicated by a broken line, the resin molten material 6 and an upper mold 3b which is arranged above the resin molten material 6 are shown. Numeral 4 indicates guide poles which have a function of arranging the upper and lower molds 3b, 3a concentrically with the cylinder 2. FIG. 2B to FIG. 2F sequentially show states in which the piston is operated in the state shown in FIG. 2A. FIG. 2B shows the state in which the mold 3b is placed on the resin molten material 6 in an inclined manner. The lower piston 7a is constituted of an exhaust passage 9a and a suction portion 8a, sucks the lower mold 3a and vertically moves in the inside of the cylinder 2. A driving force for moving the lower piston 7a vertically is obtained from a plate cam. Although the plate cam is not shown in the drawing, a strip steel is arranged in a circular shape below the cylinder 2 and controls a stroke of the piston due to the height difference. In FIG. 2C, the mold 3b is placed on the resin molten material 6 such that entanglement of air along with the lowering of the engaging member 12 can be prevented and, thereafter, the upper piston 7b is lowered to suck the mold 3b by an exhaust passage 9b and the suction portion 8b. FIG. 2D shows the state in which both of the pistons 7a, 7b are lowered and the resin molten material 6 is cut by an upper opening portion of the cylinder 2. FIG. 2E shows the state in which the upper piston 7b is lowered to press and expand the resin molten material 6 thus forming the lens 10. A center thickness of the lens is determined by an amount of the resin molten material and the pressure of the piston. FIG. 2F shows the state in which the upper and lower pistons are elevated so as to push a mold set 11 which is an integral body formed of the molds and the lens in a close contact state to the outside of the cylinder 2. The mold set 11 is taken out from the turntable 1 and is subjected to an annealing step and, thereafter, the lens is removed from the molds thus producing the lens 10. The mold set 11 has an approximately cylindrical shape in a state that the molds and the lens are brought into close contact with each other. By pushing a wedge in the radial direction and in the direction toward the center, the lens 10 is removed from the molds. An outer peripheral surface of the lens is polished to remove burrs and the like and the lens is cleaned to complete the lens. The plastic lens which uses the polycarbonate resin exhibits the weak resistance against flaws and hence, the plastic lens is coated with a hard coat layer and furthermore with a reflection prevention layer.

Embodiment 2

Figure 3:
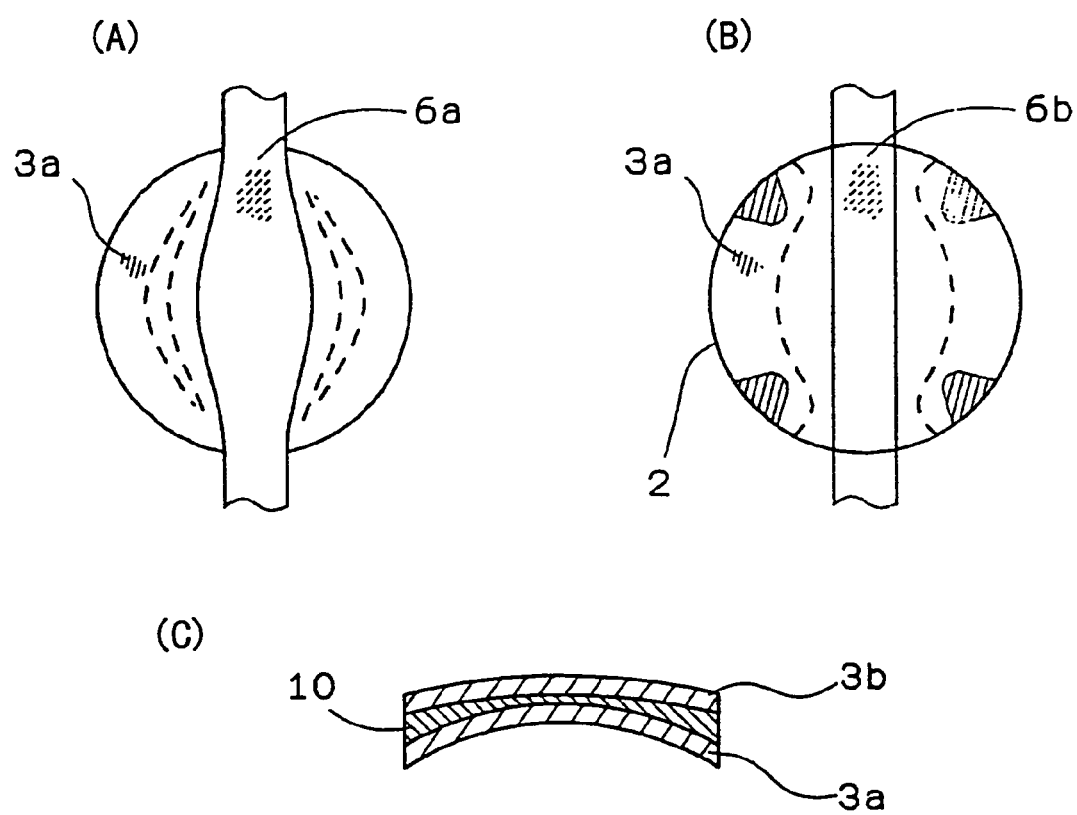

When the nozzle of the extruding machine has a circular shape and the resin molten material which is discharged from the nozzle is discharged at a fixed flow speed, provided that a moving amount of the lower mold is fixed, a thickness of the resin molten material placed on the lower mold is fixed. Here, a moving speed of the lower mold is larger than a discharge speed or a fall speed of the resin molten material, the resin molten material is elongated and the thickness thereof is decreased, while when the moving speed of the lower mold is smaller than the discharge speed or the fall speed of the resin molten material, the resin molten material is liable to dwell and hence, the thickness of the resin molten material is increased. Further, when an opening diameter of the nozzle is increased, the diameter of the resin molten material is increased, while when the opening diameter of the nozzle is decreased, the diameter of the resin molten material is decreased. Still furthermore, when a height of the nozzle with respect to a surface of the mold is changed, the thickness of the resin molten material placed on the mold is also changed. A diameter of the mold which forms the plastic lens by molding is generally 70 to 85 mm and it is advantageous to change the diameter of the nozzle for forming a portion where the discharge amount of the resin molten material is large and a portion where the discharge amount of the resin molten material is small within the length of the mold. When the resin molten material is pressed while being sandwiched between the molds, the resin is extended from a center portion to a periphery thereof. In this case, when the resin molten material is in a columnar shape, it is difficult to expect the uniform spreading of the resin molten material to the periphery. Although there is no substantial difference in thickness between the center portion and the peripheral portion with respect to the lens having a small degree (diopter), when the degree of the lens is increased, a thickness of the peripheral portion becomes relatively large particularly in case of a minus lens, while, when the thickness of the resin molten material is fixed, the resin of the peripheral portion wraps around in the circumference direction thus giving rise to an optical strain. In case that the minus lens 10 is formed by molding as shown in FIG. 3C, when the resin molten material 6b having a fixed thickness is placed on the lower mold 3a as in a plan view shown in FIG. 3B and is pressed by the upper mold 3b, the resin molten material 6b spreads in a manner shown by a broken line. This is because that the resin which is brought into contact with a wall surface of the cylinder 2 spreads along the wall surface and hence, the resin which spreads along the wall surface of the cylinder and the resin which spreads from the center portion of the mold push each other at a portion indicated by hatching thus giving rise to portions where the flow of the resin is not uniform.

Figure 4:
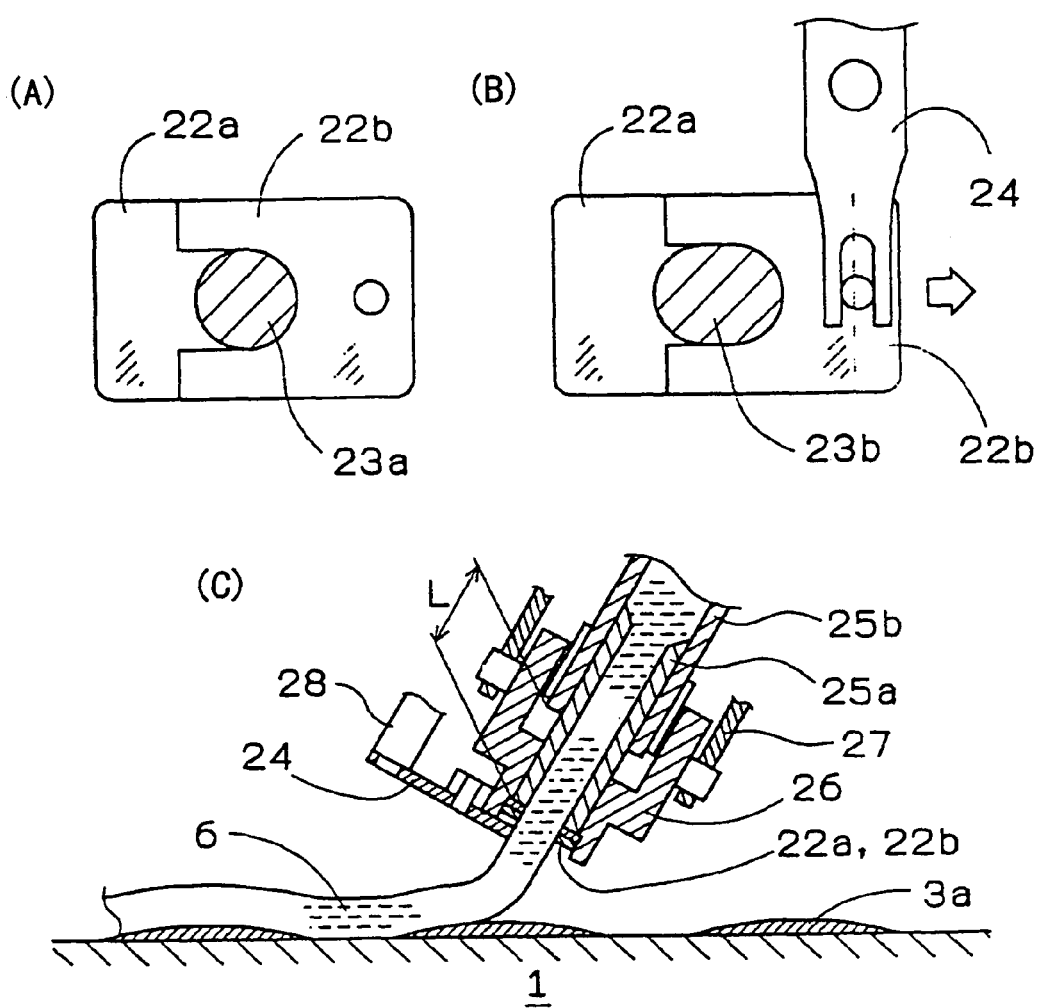

In this embodiment, as shown in FIG. 4A, an opening portion 23a having a diameter of 12 mm is formed in a distal end portion of the nozzle of the extruding machine using two overlapped dies 22a, 22b and, as shown in FIG. 4B, a discharge amount of the resin can be changed by changing the opening 23a into an opening 23b by shifting die 22b. A range within which the discharge amount can be changed is approximately within 30%. When the range is set excessively large, there exists a possibility that an agitation flow is generated in the inside of the resin molten material. The characteristic of a shape of the resin molten material 6a which is placed on the lower mold 3a is shown in a plan view in FIG. 3A. The spreading of the resin molten material 6a when the resin molten material 6a is pressed by the upper mold 3b takes the uniform spreading manner as indicated by a broken line. Although various methods are available for forming the thicker portion and the thinner portion of the resin molten material on the lower mold, in this embodiment, as shown in FIG. 4C, the nozzle of the extruding machine is constituted of two nozzles 25a, 25b, wherein the nozzle 25a is slidable along an inner surface of the nozzle 25b. A sleeve 26 is fixed to an end portion of the nozzle 25a and the above-mentioned dies 22a, 22b are mounted on the sleeve 26 in a slidable manner, wherein an opening area defined by the dies is changed using a lever 24 and a rod 28. Further, the sleeve 26 is driven by the rod 27 so as to slide the nozzle 25a whereby a length L of the nozzle is changed. Since the resin molten material which flows in the inside of the nozzle is supplied from the extruding machine by a fixed amount, it is possible to change the thickness of the resin molten material without causing dwelling of the resin molten material and hence, the fixed amount of resin flow is distributed into the thinner portion and the thicker portion thus preventing the agitation flow of the resin. Although it may be possible to allow the discharged resin molten material to fall vertically, it is preferable to discharge the resin molten material in a mode that the nozzle is inclined at a position as close as possible to the mold 3b and the resin molten material is placed on the mold 3a.

Embodiment 3

Figure 5:
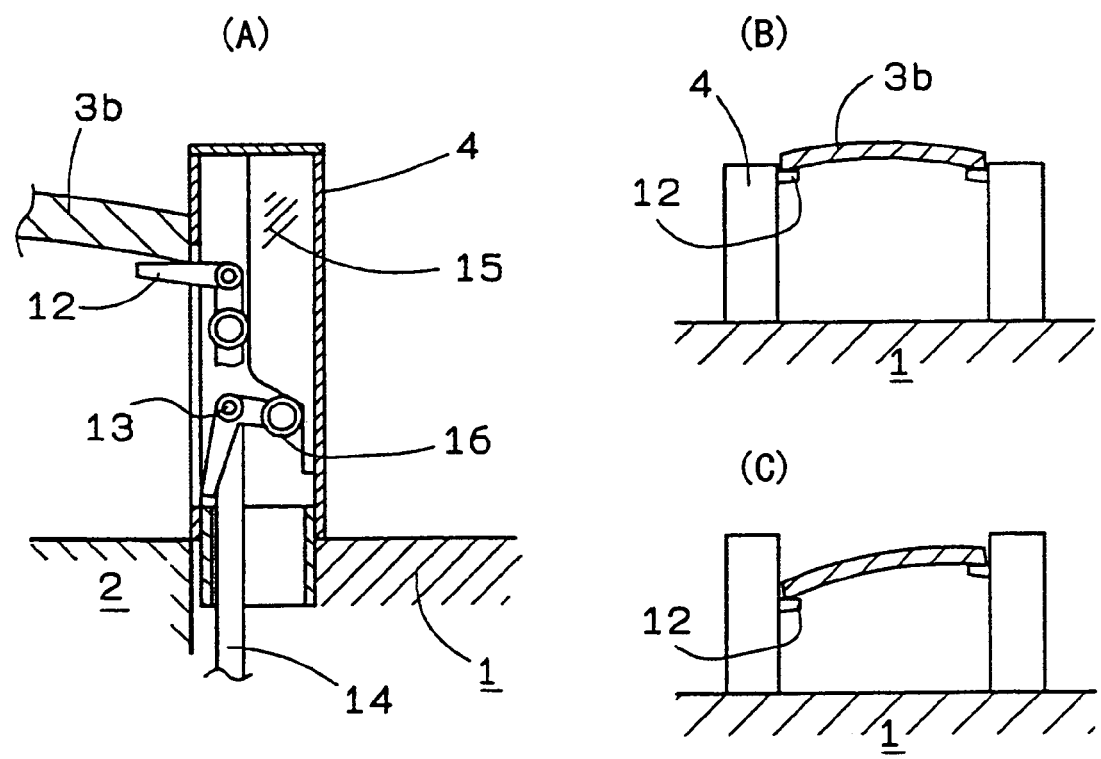

Although the upper mold 3b is arranged on the resin molten material while being guided by the guide poles 4, it is preferable to bring the upper mold 3b in contact with the resin molten material in an inclined posture with respect to the resin molten material. First of all, the mold is allowed to fall such that a one-side end portion of the mold is brought into contact with the resin molten material and the mold is sequentially shifted to a horizontal posture thus preventing the entanglement of air. As shown in FIG. 5A, each guide pole 4 is positioned on the extension line of the wall surface of the cylinder 2 on the turntable 1 and performs the positioning of the mold. Since the guide poles 4 are provided at four positions around the cylinder 2, the mold is temporarily held at a height which prevents the mold from coming into contact with the resin molten material by providing the engaging members 12 in the inside of the guide poles 4. The guide pole 4 is constituted of a tubular body and the L-shaped engaging member 12 and a rod 14 which drives a fulcrum 13 and a plate cam 15 are provided in the inside of the tubular body. The rod 14 is driven by a pneumatic cylinder. When the rod 14 is elevated, a roller 16 is brought into contact with the plate cam 15 and is elevated, and the engaging member 12 is rotated to a horizontal position and can support the mold 3b. In FIG. 5B, the engaging members 12 can receive the mold 3b in a state that the heights of the engaging members 12 of four guide poles 4 are held at the same height, while in FIG. 5C, it is possible to hold the mold 3b in an inclined manner such that the height of the engaging members 12 of two out of four guide poles 4 is adjusted to a low level and the height of the engaging members 12 of other guide poles 4 is adjusted to a high level. By allowing all engaging members to fall at the same speed in such a state, it is possible to sequentially bring the mold into contact with the resin molten material from one side.

Embodiment 4

Figure 6:
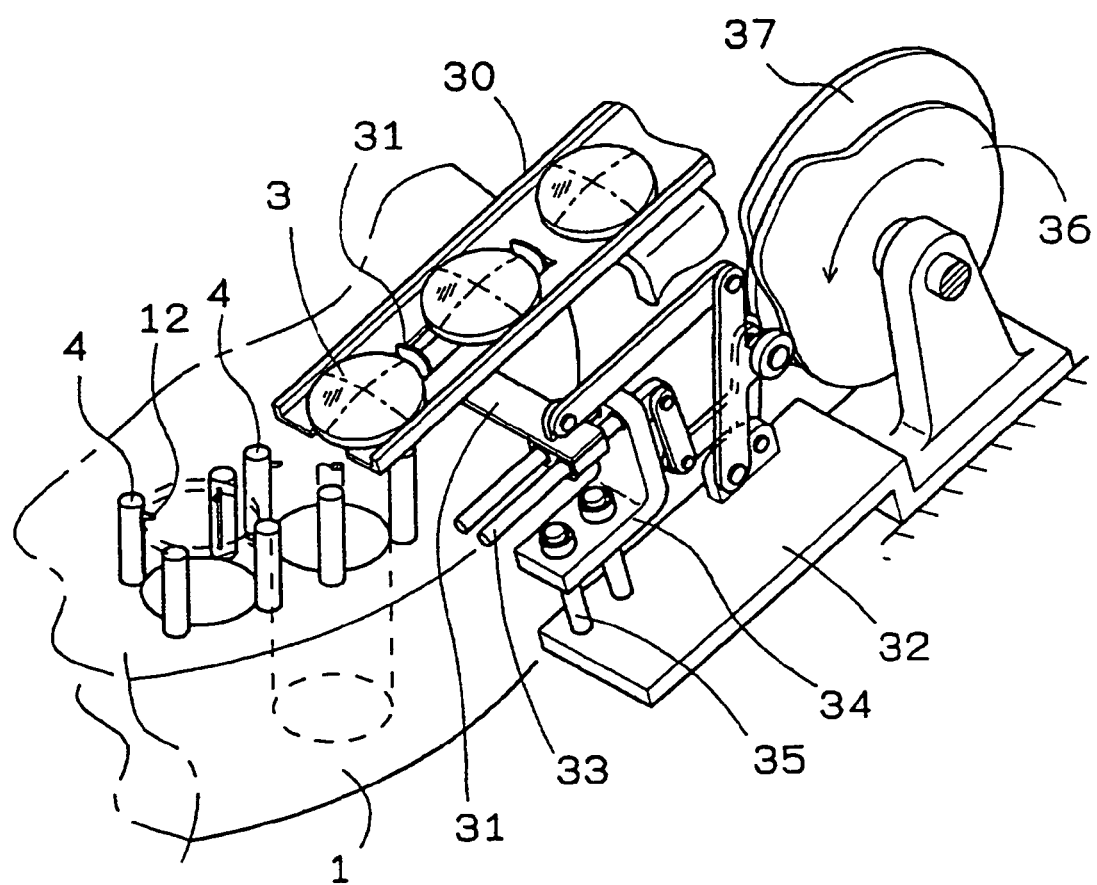
FIG. 6 is a perspective view showing another embodiment which arranges a mold (embodiment 4).

An example which directly transports a mold from a transport platform in an outlet of a heating furnace which heats the mold to guide poles of a turntable is explained in conjunction with FIG. 6. Each guide pole 4 is provided with an engaging member 12. Since center portions of four guide poles circulate on the same radius, an inclined transport platform 30 is provided in the tangential direction of the circulating circle. The transport platform 30 is contiguously formed with an outlet of the heating furnace. Further, a platform 32 is separately provided, shafts 35 are mounted on the platform 32 in a vertically erected manner, and a bracket 34 is vertically slidably supported on the shafts 35. The bracket 34 is provided with slide shafts 33 which are arranged parallel to the transport platform 30 and a pusher member 31 is slidably supported on the slide shafts 33. The pusher member 31 moves the mold 3 at a speed which is in synchronism with a circulating speed of the guide poles 4 using cams 36, 37 which are driven by a servo motor (not shown in the drawing) and a lever device shown in the drawing to feed the mold 3 to the engaging member 12. After falling below the transport platform 30, the pusher member 31 returns to the original position and again is elevated to feed the next mold. Since it is possible to move two molds 3 simultaneously, the mold to be fed next can be accurately positioned. Although not shown in the drawing, the heat of the transport platform 30 is insulated and hence, it is possible to feed the heated molds repeatedly. The transport platform 30, first of all, arranges the lower mold at the guide poles and, thereafter, places the resin molten material thereon and hence, the transport platform 30 for feeding the upper mold is provided at a separated position. Accordingly, one transport platform is not sufficient. However, the mold to be combined may be branched from the outlet of one heating furnace and the lower mold and the upper mold may be moved to the respective transport platforms. Since it is unnecessary to rapidly move the molds, it is possible to obtain an advantageous effect that the stable manipulation is performed.

Embodiment 5

It is unnecessary in the this invention to arrange (1) a step of heating a mold, (2) a step of arranging the mold, (3) a step of moving two molds including a resin molten material close to each other and performing the molding by pressing the resin molten material, (4) a step of annealing the lens in a state that the lens is brought into close contact with the mold and (5) a step of taking out the lens from the mold in a series of manufacturing lines and the extra time can be spent for enhancing the forming accuracy of the respective steps. Particularly, in the annealing step, the temperature is lowered in accordance with the specific temperature curve from the high temperature of 230° C. to 140° C. by spending approximately 40 minutes. That is, by adopting batch processing, in place of performing the lowering of temperature while moving the mold in the inside of the heating furnace, in which the mold is stored in the inside of the heating furnace using a rack and the temperature is controlled, it is possible to perform the annealing with high accuracy whereby it is surely possible to eliminate the residual strain. Particularly, in the step of forming the resin molten material by pressing using the molds, it is preferable to gently press the resin molten material not to generate the strain in the inside of the resin. This can be realized by increasing the number of forming devices corresponding to the production amount. The formed mold set is assembled as a lot and is transmitted to the annealing step.

INDUSTRIAL APPLICABILITY

According to the present invention, it is possible to produce plastic lenses such as the polycarbonate resin lenses having various degrees without requiring the expertise on a mass-production basis and hence, the manufacturing cost can be reduced. The refractive index is also relatively high, that is, 1.59 and the specific gravity is 1.2 and hence, it is possible to provide the lens which exhibits the high shock resistance so that the lens which is hardly broken thus realizing the high safety can be obtained.

The invention claimed is:
1. A method of manufacturing a plastic lens in which a rotatable disc is provided and a plurality of cylinders which allow molds to pass therethrough are provided along an inner circumference of the rotatable disc, a piston shaft which includes a mold holding portion being arranged on a center axis of the cylinder, the molds having a planned combination, the method comprising:
placing two respective ones of the molds which have the planned combination on a transport base;
heating the two molds in a state that a one of the two molds having a convex forming surface is heated with the form- ing surface directed upwardly and the mold having a concave forming surface is heated with the forming surface directed downwardly;

holding one of the two molds in the inside of the cylinder;

controlling the piston shaft using at least one pre-controlled automatic transport device and/or manually such that the forming surface of said one of the two molds having the convex forming surface assumes substantially a same height as an upper surface of an opening portion of the cylinder or slightly projects from the upper surface of the opening portion thus arranging the mold in a fixed manner;

causing an optical thermoplastic resin molten material having no agitation flow or having negligible agitation flow to flow out from a nozzle of an extruding machine so as to be placed on the one of the two molds, the resin molten material which flows out from the nozzle of the extruding machine along with the rotation of the disc being placed in a direction of the rotation so as to create a band of said resin molten material which extends continuously from a first region of a top surface of said rotatable disc adjacent to a first side of said one of the two molds, entirely across said one of the two molds, to a second region of the top surface of said rotatable disc adjacent to a second side of said one of the two molds, the resin molten material being extruded in such manner that said band is produced with a gradually increased volume per a unit length in a region thereof corresponding to a center of said one of the two molds as compared to a corresponding volume per unit length of the band of resin molten material corresponding to a peripheral region of said one of the two molds;

subsequently placing an other of the two molds having the concave forming surface on the resin molten material with the forming surface directed downwardly; and urging both of said two molds towards one another in the inside of the cylinder until a given distance is defined so as to form a plastic lens by pressing the resin molten material.

2. A method of manufacturing a plastic lens in which a rotatable disc is provided and a plurality of cylinders which allow molds to pass therethrough are provided along an inner circumference of the rotatable disc, a piston shaft which includes a mold holding portion being arranged on a center axis of the cylinder, the molds having a planned combination, the method comprising:

placing two respective ones of the molds which have the planned combination on a transport base;

heating the two molds in a state that a one of the two molds having a convex forming surface is heated with the forming surface directed upwardly and the mold having a concave forming surface is heated with the forming surface directed downwardly;

holding one of the two molds in the inside of the cylinder;

controlling the piston shaft using at least one pre-controlled automatic transport device and/or manually such that the forming surface of said one of the two molds having the convex forming surface assumes substantially a same height as an upper surface of an opening portion of the cylinder or slightly projects from the upper surface of the opening portion thus arranging the mold in a fixed manner;

causing an optical thermoplastic resin molten material having no agitation flow or having a negligible agitation flow to flow out from a nozzle of an extruding machine so as to be placed on the one of the two molds, the resin molten material which flows out from the nozzle of the extruding machine along with the rotation of the disc being placed in a direction of the rotation over an area ranging from a one-side end portion to another-side end portion with respect to the center of the convex forming surface;

subsequently placing an other of the two molds having the concave forming surface on the resin molten material with the forming surface directed downwardly; and urging both of said two molds towards one another in the inside of the cylinder until a given distance is defined so as to form a plastic lens by pressing the resin molten material, wherein, the automatic transport device comprises:

an inclined transport base which transports the molds in the tangential direction of a circle which the center of the rotating cylinder opening portion draws; and an extruding member which extrudes the molten material at a speed in synchronism with a circumferential speed of the cylinder opening portion is mounted on the transport base, and the mold is moved in the center direction of the cylinder.

3. A method according to claim 1 or 2, wherein a relative moving speed or a distance between the mold which is arranged on the cylinder opening portion of the disc in a fixed manner by the piston shaft and a distal end portion of the nozzle of the extending machine is configured to be variable.

4. A method according to claim 1 or 2, wherein an engaging member which is brought into contact with the opening portion of the cylinder for engaging the mold is provided movably in the vertical direction so as to incline a posture of the upper mold to be arranged and to lower the upper mold in a posture having an angle with respect to the mold which is arranged below.

5. A method according to claim 1 or 2, wherein the automatic transport device is a robot hand which transports the mold to the cylinder opening portion in accordance with the planned combination.

6. A method according to claim 1, wherein a change in a discharge amount of the resin molten material is maintained within 30%.

7. A method according to claim 1, wherein a pair of overlapping dies is disposed at a distal end portion of the nozzle, relative shifting of the dies changing a variable opening provided thereby and effecting a change in a discharge amount of the resin molten material.

8. A method according to claim 1, wherein the nozzle is comprised of a pair of inner and outer nozzle parts mutually slidable to effect a change in a discharge amount of the resin molten material.

9. A method of manufacturing a plastic lens, comprising:

imparting a fixed speed of rotation to a rotatable disc about a rotation axis, said rotatable disc including cylindrical passages being disposed peripherally of said disc along an inner circumference thereof, said cylindrical passages extending coaxially with said rotation axis;

providing respective pairs of molds, each of said pairs of molds comprising a lower mold and an upper mold, said lower mold and said upper mold defining a predetermined combination in which said lower mold presents a convex forming surface and said upper mold includes a concave forming surface;

placing said pairs of molds on a transport platform such that each said lower mold is oriented with the convex forming surface directed upwardly and the upper mold is oriented with the concave forming surface directed downwardly;

heating said pairs of molds on said transport platform;

arranging a lower piston shaft which includes a mold holding portion movable vertically within each of said cylindrical passages along a center axis of each of said cylindrical passages;

transferring a one said lower mold from said transport platform to said mold holding portion corresponding to a respective one of said cylindrical passages;

controlling a vertical position of the piston shaft such that the convex forming surface of said lower mold assumes substantially a same height as an upper surface of an opening portion of the corresponding one of said cylindrical passages or slightly projects from the upper surface of the opening portion so as to support the lower mold in a fixed manner;

causing an optical thermoplastic resin molten material having no agitation flow or having a negligible agitation flow to flow out from a nozzle of an extruding machine as an extruded band of said optical thermoplastic resin molten material deposited, along with the rotation of the disc in a direction of the rotation, across the convex forming surface and extending at least into a region of a top surface of the rotatable disc which is disposed between said corresponding one of said cylindrical passages and an adjacent one of said cylindrical passages;

subsequently transferring a one said upper mold from said transport platform onto the resin molten material with the concave forming surface directed downwardly; and urging said upper mold and said lower mold said towards one another in an inside of the corresponding one of said cylindrical passages until a given distance is defined therebetween so as to form a plastic lens by pressing the resin molten material.

10. A method according to claim 9, further comprising bringing an engaging member which is vertically movable into contact with the opening portion of a one of the cylindrical passages for engaging the upper mold so as to incline a posture of the upper mold and to lower the upper mold in a posture having an angle with respect to the lower mold.

11. A method according to claim 9, wherein said controlling a vertical position of the piston shaft includes use of an automatic transport device, said automatic transport device comprising:

an inclined transport base which transports the pairs of molds in the tangential direction of a circle which a center of the rotating opening portion of the corresponding one of the cylindrical passages draws; and an extruding member which extrudes the molten material at a speed in synchronism with a circumferential speed of the opening portion of the corresponding one of the cylindrical passages is mounted on the transport base, and the mold is moved in a center direction of the corresponding one of the cylindrical passages.

12. A method according to claim 9, wherein a pair of overlapping dies is disposed at a distal end portion of the nozzle, relative shifting of each of the dies changing a variable opening provided thereby and effecting a change in a discharge amount of the resin molten material.

13. A method according to claim 9, wherein the nozzle is comprised of a pair of inner and outer nozzle parts mutually slidable to effect a change in a discharge amount of the resin molten material.

* * * * *